Nov. 15, 1966  E. G. HUBBARD  3,285,670
CONVEYING DEVICE AND METHOD
Filed March 10, 1965
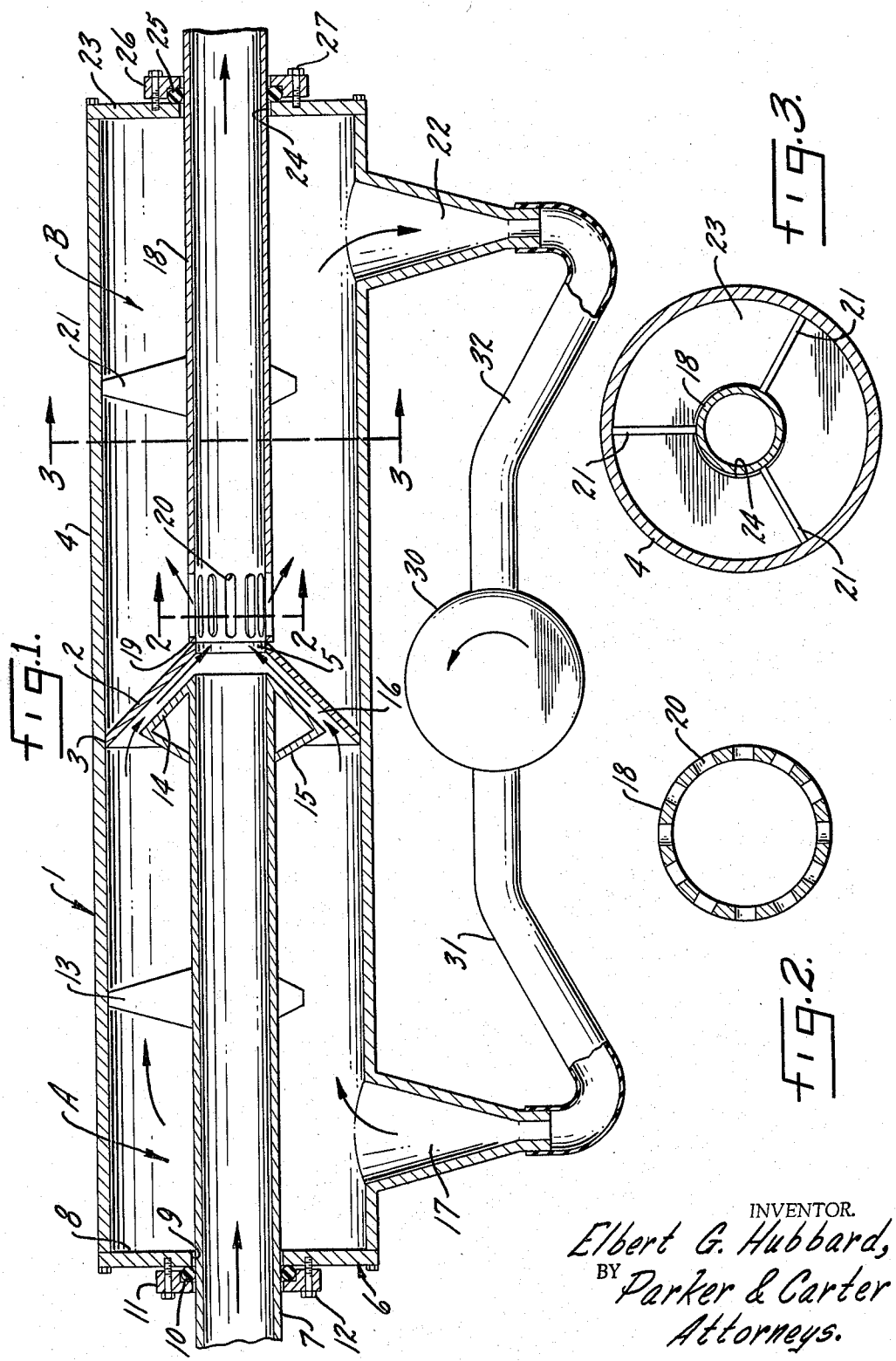
INVENTOR.
Elbert G. Hubbard,
BY Parker & Carter
Attorneys.

United States Patent Office 3,285,670
Patented Nov. 15, 1966

3,285,670
CONVEYING DEVICE AND METHOD
Elbert G. Hubbard, Maywood, Ill., assignor, by mesne assignments, to Pneumatic Conveying Systems Co., Maywood, Ill., a corporation of Illinois
Filed Mar. 10, 1965, Ser. No. 438,602
5 Claims. (Cl. 302—23)

This invention relates to the art of conveying and has particular relation to the art of pneumatic conveying.

One purpose of the invention is to provide a means and method of conveying materials whereby said materials are free from potentially injurious contact with moving or stationary parts such as blades, valves, feeders or the like.

Another purpose is to provide a means and method of conveying a wide variety of materials at high volume and rapid rate over substantial distances.

Another purpose is to provide a means and method of conveying material which may be employed at a wide choice of locations over the route in which the materials are to be conveyed.

Another purpose is to provide a conveying means and method requiring a minimum energy expenditure.

Yet another purpose is to provide a conveying means and method of maximum compactness and simplicity in manufacture and use and of minimum cost in construction and operation.

Another purpose is to provide a conveying means and method wherein a tendency of materials to be drawn toward an air-withdrawal area is avoided.

Another purpose is to provide conveying means and method having a continuous, stable material-ingesting and conveying action.

Other purposes will appear from time to time in the course of the specification and claims.

The invention is illustrated more or less diagrammatically in the accompanying drawings wherein:

FIGURE 1 is a side cross section,
FIGURE 2 is a view on the line 2—2 of FIGURE 1, and
FIGURE 3 is a view on the line 3—3 of FIGURE 1.

Referring now to the drawings, a hollow elongated housing 1 is divided into chambers A and B by an internal frustoconical baffle 2 secured to the inner surface of the cylindrical wall 4 of housing 1 as indicated at 3. The central aperture 5 of baffle 2 is coaxial with housing 1 and positioned substantially intermediate the ends of housing 1. Extending into housing 1 and aperture 5 is a conveyor tube or conduit 7. The end of wall 4 of housing 1 at its end 6 has secured thereto an end closure plate 8 having a central aperture 9 through which the conduit 7 extends. A seal ring 10 engages the outer surface of conduit 7 adjacent and outwardly of aperture 9 and a clamp ring 11 is secured by any suitable means, such as the fasteners 12, to the plate 8 to urge the ring 10 into sealing and retaining engagement with the conduit 7. Radially directed braces 13 are secured to the outer surface of conduit 7 and engage the inner surface of housing wall 4 to retain the conduit 7 against lateral movement within the housing 1.

The inner end of conduit 7 terminates just short of baffle 2 and carries a rearwardly inclined conically disposed, annular flange 14. A reverse angularly disposed annulus 15 extends from the outer end of flange 14 back toward and into engagement with the outer surface of conduit 7. It will be observed that the flange 14 parallels the opposed, spaced surface of baffle 2 and forms with the baffle 2 a frusto-conical nozzle passage 16. Nozzle passage 16 is inwardly directed in the downstream direction or in the direction of material conveyance. It has been found most effective to incline nozzle passage 16 at an included angle of 7½° to 30° with the axis of conduits 7 and 18. A pressure inlet 17 is formed in the wall 4 of housing 1 adjacent the closure plate 8 and spaced from baffle 2.

Extending into housing 1 from the opposite direction to that of conduit 7 is a conduit 18 having an inner diameter equal to and axially aligned with those of conduit 7 and baffle aperture 5. The inner end 19 of conduit 18 is positioned adjacent and in axial alignment with the central opening 5 in baffle 2. A plurality of longitudinally disposed parallel slots 20 are formed in the end portion of conduit 18 adjacent the edge of end 19, the slots 20 being circumferentially spaced about the tubular conduit 18. Braces 21 are radially disposed between conduit 18 and housing wall 4 to position the conduit 18 laterally within the housing 1. A vacuum outlet 22 is formed in the wall 4 of housing 1 adjacent a closure plate 23 which is secured to the open end of wall 4 opposite that closed by plate 8. A sealing and retaining structure 25, 26, 27, corresponding respectively to that shown at 10, 11, 12, is provided for the conduit 18 to seal and retain the same adjacent its extension through the aperture 24 in plate 23.

A pressure-generating or blower device 30 is illustrated more or less diagrammatically in FIGURE 1. Since the device 30 may take a variety of conventional forms and since the details thereof form no part of the present invention, said details are, for clarity, not further shown or described. A conduit 31 communicates the device 30 with the pressure inlet 17 of housing 1. A conduit 32 communicates the vacuum outlet 22 of housing 1 with the device 30.

FIGURE 3 illustrates the arrangement of positioner vanes 21. It will be understood that the vanes 13 are similarly arranged.

FIGURE 2 illustrates the arrangement of slots or openings in circumferentially spaced relation.

Whereas the preferred embodiment of this invention has been shown and described, it should be realized that there are many modifications, substitutions and alterations thereto within the scope of the following claims.

The use and operation of the invention are as follows:

Seals 10, 25 may be loosened to permit longitudinal movement of conduit portions 7, 18 for adjustment of nozzle 15 and said seals are then tightened by rings 11, 26 to lock conduits 7, 18 against longitudinal movement.

When the device 30 is activated, air under pressure is delivered to inlet 17. As indicated by the arrows in FIGURE 1, air under pressure entering at inlet 17 flows through chamber A, to the left of baffle 2 as the parts are shown in the drawings, about the outer surface of conduit 7, past the positioning vanes 13 and into the nozzle channel 16 formed by and between flange 14 and baffle 2. The flange 15 seals off the area behind flange 14 and between flange 14 and conduit 7 to preclude a dead or turbulent area for the air entering from inlet 17.

The air is directed by nozzle passage 16 into the cylindrical material-conveying area extending axially through the housing 1 within and defined by the conduits 7, 18. Air is thus directed in a conical conformation or cone and in a downstream direction considering the flow or path of material to be conveyed as extending from left to right as the parts are shown in the drawings and as indicated by the heavy dark arrow in the left-hand portion of conduit 7. The cone of pressure air thus formed has its peak within the vacuum or reduced-pressure area of the slots 20. An aspirating or lowered pressure effect is created within the conduit 7.

Air is drawn through the slots 20 by the action of the device 30 in communication with the outlet 22. Where the inner edge 19 of conduit 18 is, as shown, not in contact or integral with baffle 2, it will be understood that air may be similarly drawn from the area between the edge 19 and the opposed edge of baffle 2 about aperture 5. In any event, air drawn from the area of the slots 20 is drawn through chamber B, to the right of baffle 2 as the parts are shown in the drawings, past the vanes 21 and through outlet 22 for return to the device 30.

Thus is created a continuous, substantially closed flow of air in which a predetermined quantity of air is directed from the device 30 through conduit 31, inlet 17, chamber A, nozzle 16, slots 20, chamber B, outlet 22 and conduit 32 back to the device 30.

With the creation of an aspiring or lowered pressure effect by air flowing through nozzle 16 toward and into conduit 18, the material to be conveyed is drawn into the inlet end of conduit 7 positioned outwardly of housing 1 and in the direction of the heavy arrow shown in FIGURE 1. As said material is thus drawn or carried by a column or flow of air within conduit 7, it is drawn rapidly toward and through the aperture 5 in baffle 2. When so drawn into conduit 7, substantial kinetic energy is imparted to the material being conveyed. This material is thus caused to move rapidly past the screen formed by slots 20. Since the material meets an inwardly conical, downstream-directed flow of air entering at nozzle 16 and extending into the area of screen 20, the material is centered and held away from contact with the screen 20 and is protected against the effect of the vacuum or lowered pressure existing at the screen 20 which might otherwise tend to draw and hold the material being conveyed against the screen 20. It will be understood that the material being conveyed may be greatly varied in nature and form. A great number of such products or materials will tend to flow centrally through the conduits 7, 18 and out of contact with the inner wall surfaces thereof. With the exception of wet or tacky materials, the device is capable of conveying virtually any products of a size such as may set loosely within the conduits 7, 18. Where powedered materials are conveyed, it will be understood that such materials may be drawn through conduits 32, 31 and device 30 and the consequent coating of such elements, the loss of some materials thereby and the redelivery of powdered material within the air entering inlet 17 may render the device less suitable for pneumatic conveying of powdered or finely divided dustlike materials. With the sole exceptions, therefore, of wet or finely powdered materials, the means and method of the invention are effective to provide highly effective, rapid, high-volume conveying of material over substantial distances.

It appears that the means and method of the invention create a type of flywheel effect in that a continuous column of air is initially generated by the aspiration effect of nozzle 16 and that the withdrawal of air through screen 20 does not deter the movement of said column of air but, in fact, contributes thereto. Whether the air drawn through screen 20 is composed only of air delivered at inlet 17, the air entering the inlet of conduit 7, or a mixture thereof and whether the air conveying material through conduit 18 downstream of housing 1 is solely that entering the inlet of conduit 7, that entering through nozzle 16, or a mixture thereof, it will be understood that the same quantity of air delivered at inlet 17 is withdrawn at outlet 22 and the quantity of air entering the inlet of conduit 7 enters conduit 18.

As a type of analogy, the air within conduits 7, 18 may be considered as a continuous rod and the action of the air flowing inwardly through nozzle 16 and outwardly through screen 20 may be considered as operating like a set of rollers through which said rod is being continuously drawn. It is recognized that the elimination of screen 20 and the withdrawal of air therethrough with the creation of an aspiration through nozzle 16 and the passage of all air entering nozzle 16 into and through conduit portion 18 would produce a flow of air through the conduits 7, 18 and would produce a conveying action.

It would thus appear that the insertion and substantially immediate withdrawal of a given quantity of air would be at best unnecessary and at worst unworkable.

Experiments have indicated, however, that the suction action produced at the inlet of conduit 7 to draw material thereinto by aspiration through nozzle 16 alone is unstable and variable and that the conveying action produced alone by aspiration is weak and limited in volume of both air and material, speed, continuity and distance. The provision of screen 20 and withdrawal of air therethrough by device 30 through chamber B, outlet 22 and conduit 32 results in a continuous, predetermined and stable suction action at the inlet of conduit 7 to draw material continuously thereinto and in increased volume, speed and distance of the conveying action. Since the same quantity of air delivered at inlet 17 is withdrawn at outlet 22, the overloading of conduit 18 with excess air is precluded. In previously known conveying means employing an upstream vacuum withdrawal and a downstream pressure delivery, a tendency has existed for said certain types of materials to be drawn or deflected under certain conditions toward the vacuum outlet. Where a screen has been employed at such vacuum outlet, it has been found possible to trap certain types of materials on said screen and to limit or close off the vacuum operation and thus impede or stop the action of the device. In the present invention, the screen 20 is protected by a flow of air thereacross and a centering of the material being conveyed as it meets the conical inflow of air from nozzle 16. Thus the material is moved rapidly across or past screen 20 in spaced relationship therewith without an effect thereupon by the vacuum action of withdrawing air through screen 20. The means and method of the invention are thus capable of conveying all of the material conveyable by said previously known means, and in addition, are capable of conveying materials which might prove difficult to convey with said prior means. Further, the delivery of the pressure cone of air into the vacuum or low-pressure area of screen 20 appears to require less energy expenditure in a given conveying action.

What is claimed is:

1. Conveying means including a housing, a first chamber in said housing, a second chamber in said housing, air pressure generating means communicating with said first and second chambers to deliver air under pressure to said first chamber and to withdraw air from said second chamber in a substantially closed system, a conveying conduit extending through said housing, nozzle means communicating with said first chamber and positioned to direct air from said first chamber into said conduit, screen means in said second chamber and positioned adjacent said nozzle means, said screen means communicating said conduit with said second chamber, said nozzle means including a frusto-conical baffle, said baffle having a central aperture of a diameter corresponding to and axially aligned with that of said conduit, a frusto-conical flange carried by said conduit and extending in spaced, parallel relationship with said baffle to form a conical nozzle passage communicating said first chamber with the area within said conduit.

2. Conveying means including a housing, a first chamber in said housing, a second chamber in said housing, air pressure generating means communicating with said first and second chambers to deliver air under pressure to said first chamber and to withdraw air from said second chamber in a substantially closed system, a conveying conduit extending through said housing, nozzle means communicating with said first chamber and positioned to direct air from said first chamber into said conduit, screen means in said second chamber and positioned adjacent said nozzle means, said screen means communicating said conduit with said second chamber, said nozzle means including a frusto-conical baffle, said baffle having a central aperture of a diameter corresponding to and axially aligned with that of said conduit, a frusto-conical flange carried by said conduit and extending in spaced, parallel relationship with said baffle to form a conical nozzle passage communicating said first chamber with the area within said conduit, a second flange carried by said conduit and joining said first flange to close the same against entry of air into the area within said first flange.

3. Conveying means including a housing, a conveying conduit extending through said housing, said conduit having a first portion extending into said housing from one direction and a second portion extending into said housing from the other direction, the inner ends of said conduit portions being spaced one from the other within said housing, a baffle in contact with the inner wall of said housing and extending into the space between said conduit portions, an enlargement carried by said first conduit portion and having a surface in spaced parallel relation with said baffle to form an inlet nozzle passage communicating said housing on one side of said baffle with the area within said conduits and directing air from said housing on one side of said baffle into said second conduit portion, a screen carried by said second conduit portion and communicating the area within said housing on the opposite side of said baffle with the area within said second conduit portion adjacent said baffle, an air inlet in said housing communicating with said first chamber, an air outlet in said housing communicating with said second chamber.

4. Conveying means including a housing, a frusto-conical baffle dividing said housing into a first chamber and a second chamber, said frusto-conical baffle having a central aperture, an air inlet in said housing communicating with said first chamber, an air outlet in said housing communicating with said second chamber, a conveyor conduit portion extending into said first chamber, means carried by said conveyor conduit portion and defining with said baffle an air inlet nozzle positioned to deliver air from said first chamber toward said second chamber, a second conduit portion extending into said second chamber and positioned to receive said air from said nozzle, a screen carried by said second conduit portion and positioned adjacent said nozzle and to communicate said second chamber with the area within said second conduit adjacent said baffle.

5. Conveying means including a housing, a frusto-conical baffle dividing said housing into a first chamber and a second chamber, said frusto-conical baffle having a central aperture, an air inlet in said housing communicating with said first chamber, an air outlet in said housing communicating with said second chamber, a conveyor conduit portion extending into said first chamber, means carried by said conveyor conduit portion and defining with said baffle, an air inlet nozzle positioned to deliver air from said first chamber toward said second chamber, a second conduit portion extending into said second chamber and positioned to receive said air from said nozzle, a screen carried by said second conduit portion and positioned adjacent said nozzle and to communicate said second chamber with the area within said second conduit adjacent said baffle, air pressure generating means communicating with said air inlet to deliver air under pressure thereto and communicating with said outlet to receive air therefrom.

References Cited by the Examiner

UNITED STATES PATENTS 3,205,016  9/1965  Panning _____ 302—23

FOREIGN PATENTS 1,099,520  3/1955  France.

ANDRES H. NIELSEN, *Primary Examiner.*